United States Patent
Duval et al.

(10) Patent No.: US 6,578,872 B2
(45) Date of Patent: Jun. 17, 2003

(54) VEHICLE STEERING COLUMN INCLUDING A PYROTECHNIC CHARGE

(75) Inventors: Benoît Duval, Vendome (FR); Abdel Karim Ben Rhouma, Vendome (FR); Philippe Badaire, Montoire (FR); Sylvain Antigny, Vendome (FR)

(73) Assignee: Nacam France S.A., Vendome (FR)

( * ) Notice: Subject to any disclaimer, the term of this patent is extended or adjusted under 35 U.S.C. 154(b) by 0 days.

(21) Appl. No.: 09/906,086

(22) Filed: Jul. 17, 2001

(65) Prior Publication Data

US 2002/0020999 A1 Feb. 21, 2002

(30) Foreign Application Priority Data

Jul. 26, 2000 (FR) ............................................. 00 09815

(51) Int. Cl.$^7$ ................................................ B62D 1/19
(52) U.S. Cl. ......................................... 280/777; 74/492
(58) Field of Search .............................. 280/777, 775; 180/271, 274; 74/493, 492

(56) References Cited

U.S. PATENT DOCUMENTS

| | | | | |
|---|---|---|---|---|
| 4,968,058 A | * | 11/1990 | Jones ........................... | 280/777 |
| 5,595,399 A | * | 1/1997 | Fouquet et al. .............. | 280/777 |
| 5,609,364 A | | 3/1997 | Fouquet et al. | |
| 5,720,496 A | * | 2/1998 | Riefe et al. .................. | 188/371 |
| 6,019,391 A | * | 2/2000 | Stuedemann et al. ........ | 280/775 |
| 6,183,012 B1 | * | 2/2001 | Dufour et al. ............... | 188/371 |
| 6,227,571 B1 | * | 5/2001 | Sheng et al. ................. | 280/731 |
| 6,234,528 B1 | * | 5/2001 | Ben-Rhouma et al. ....... | 280/777 |
| 6,367,840 B1 | * | 4/2002 | Duval et al. ................. | 280/777 |
| 2002/0073798 A1 | * | 6/2002 | Ryne et al. .................... | 74/492 |

FOREIGN PATENT DOCUMENTS

| | | | | |
|---|---|---|---|---|
| DE | 4005259 A1 | 8/1991 | | |
| DE | 4241391 A1 | * | 6/1993 | ............ B62D/1/18 |
| DE | 4340633 A1 | * | 6/1994 | ........... B60R/21/00 |
| EP | 1018463 A1 | 7/2000 | | |
| JP | 11029049 A | * | 2/1999 | ............ B62D/1/19 |

\* cited by examiner

Primary Examiner—Lesley D. Morris
Assistant Examiner—Daniel Yeagley
(74) Attorney, Agent, or Firm—Lawrence E. Laubscher, Sr.

(57) ABSTRACT

A system for variable absorption of energy in the direction of the axis of an automobile vehicle steering column includes a steering shaft mounted in a body-tube connected to a mobile support member connected to a fixed support member fastened to the chassis of the vehicle and immobilized thereon up to a particular value. A coil is disposed on each side of the steering shaft and is connected to each of the fixed and mobile support members by a respective connecting pin A pyrotechnic displacement system operates selectively on a mobile retaining rod of each coil to modulate the absorption of energy in the event of an impact.

16 Claims, 6 Drawing Sheets

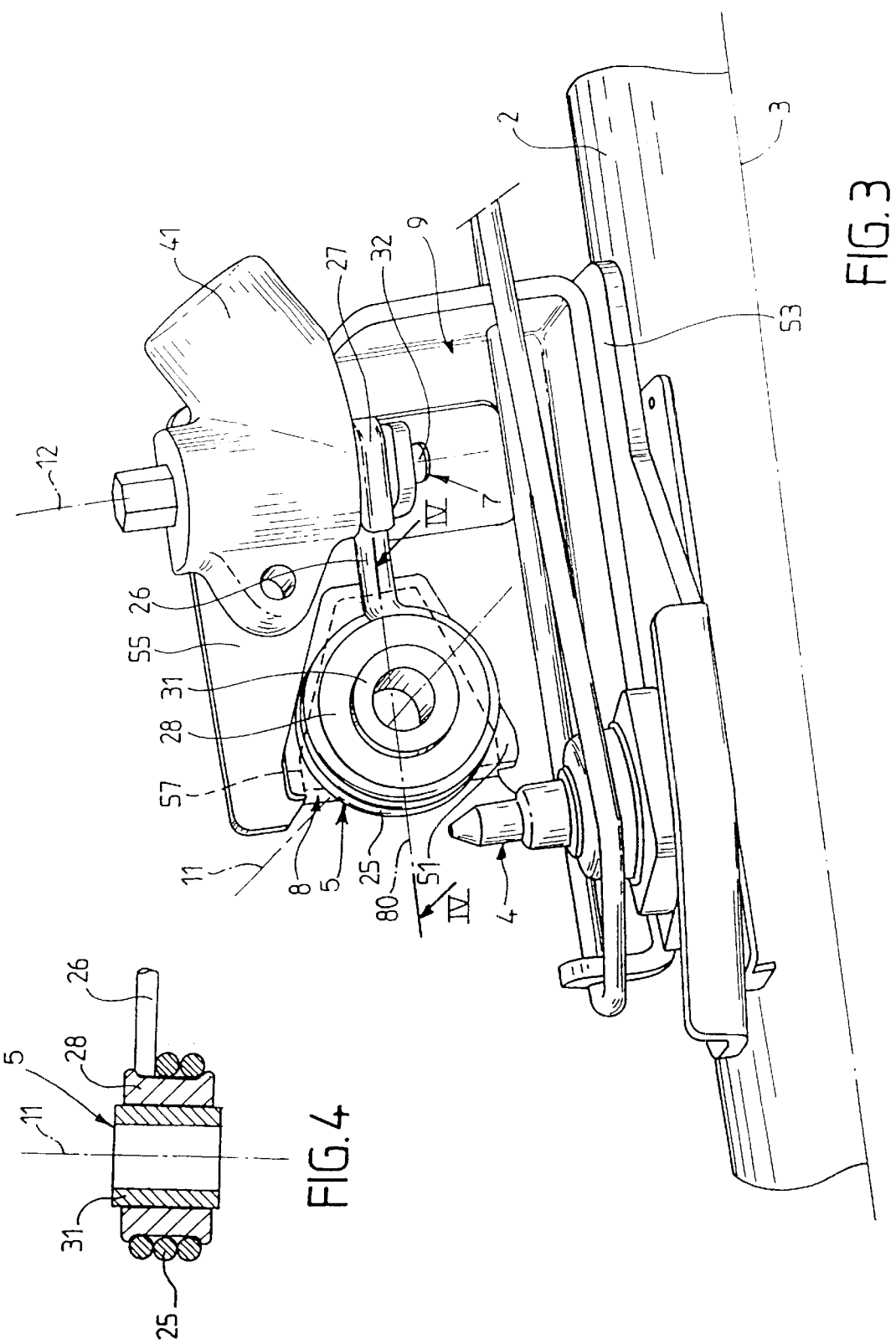

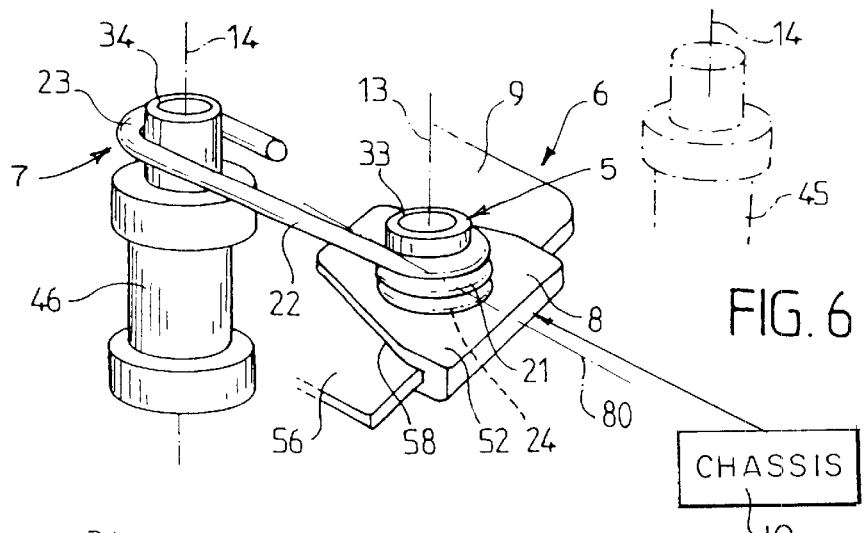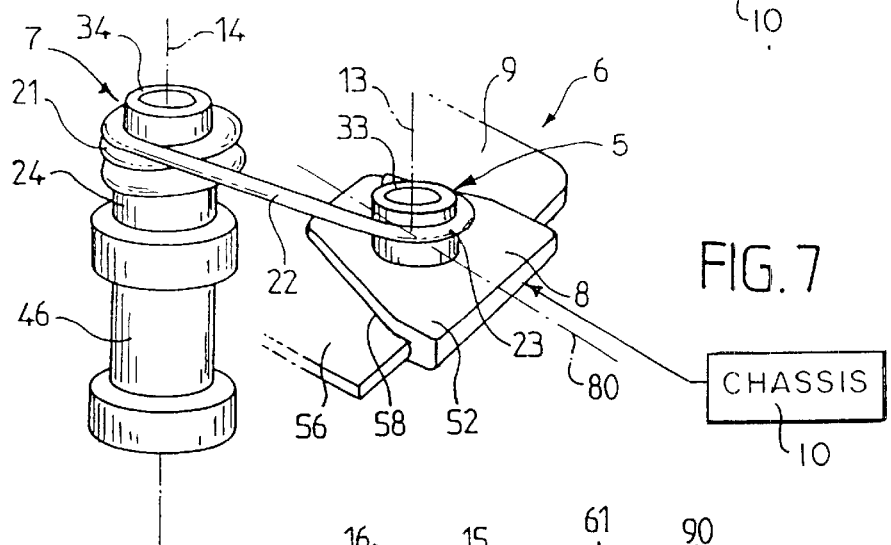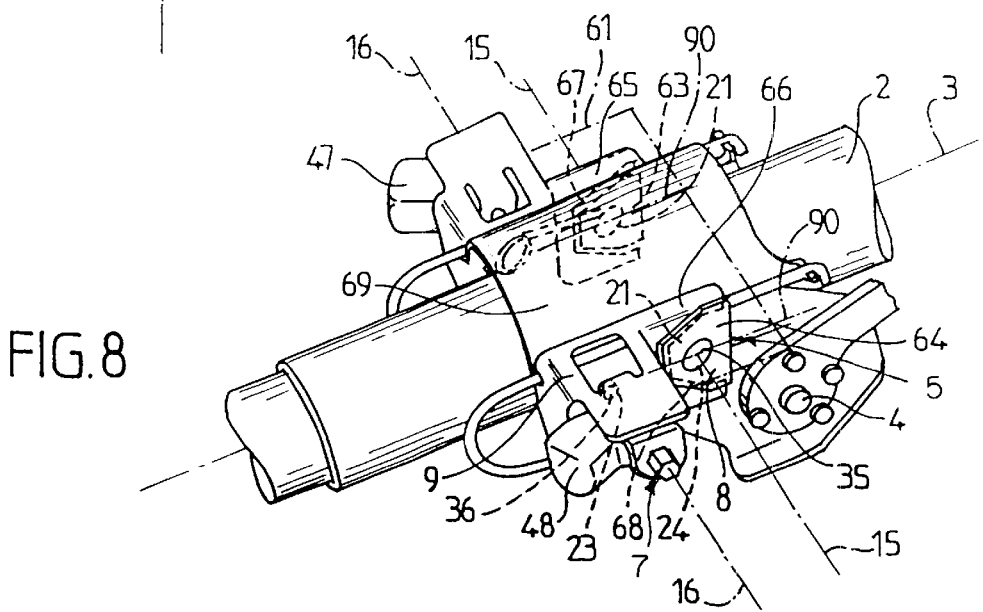

VEHICLE STEERING COLUMN INCLUDING A PYROTECHNIC CHARGE

BACKGROUND OF THE INVENTION

Field of the Invention

The present invention relates to a system for variable absorption of energy from automobile vehicle steering columns acting directly on, and in the direction of the axis of, the steering column and employing pyrotechnic charges. The system according to the invention applies in particular to a steering column whose depth or inclination can be adjusted or to a steering column whose depth and inclination can be adjusted. The invention can equally be applied to a steering column that is not adjustable.

BRIEF DESCRIPTION OF THE PRIOR ART

Ongoing improvement in steering column safety requires manufacturers to master all the parameters of energy-absorbing systems. Accordingly, with regard to the method of absorbing energy by unwinding a wire, which is increasingly used on steering columns, consideration is being given to modulating the absorption of energy in accordance with characteristics such as, in particular, the weight of the driver, whether the driver's seat-belt is fastened or not, the driver's position relative to the steering wheel, and the speed of the vehicle, which characteristics all affect the steering wheel in the event of an impact.

SUMMARY OF THE INVENTION

The object of the present invention is to propose a variable energy-absorbing system that acts directly on, and in the direction of the axis of, the steering column, uses wires with a simple shape that is easy to make, enables quantified absorption of all or part of the energy required to be dissipated, takes into account characteristics of the driver and the vehicle, and is easy to install within the overall size of existing steering columns.

One embodiment of the invention relates to a system for variable absorption of energy from an automobile vehicle steering column which includes a steering shaft rotatably mounted in a body-tube to rotate about a steering axis. The body-tube is connected to a support system that is fixed to the chassis of the vehicle.

A fixed support member is fastened to the chassis of the vehicle and a mobile support member is connected to the fixed support member to constitute the support system. The mobile support member is connected to the fixed support member and immobilized thereon up to a particular value so that said immobilization ceases in the event of an impact.

Two coils are made from a metallic member with a particular section. The two coils are connected to the fixed support member and to the mobile support member. One of the two coils is disposed on one side of the vertical plane passing through the steering axis and the other coil is disposed on the other side of the vertical plane passing through the steering axis.

Each coil is connected to the fixed support member and to the mobile support member by connecting pins consisting of retaining rods.

Each coil is mounted on a roller that is disposed on a retaining pin constituting the connecting pin with one of the two support members. Each coil has a linear portion in substantially the same direction as the force to be damped and extended by a free end which is attached to a fastening pin constituting the connecting pin with the other support member.

One of the two connecting pins of each coil consists of a retaining rod that can be moved in the direction of its axis by a pyrotechnic displacement system actuated by an actuator system.

In the event of an impact, and depending on the value of the parameters adopted, the mobile support member is connected to the fixed support member by a required number of coils, which number can be determined in accordance with certain characteristics of the driver, the driver's position relative to the steering wheel, whether the driver's seat-belt is fastened or not, and in accordance with the speed of the vehicle. The mobile support member, which is connected to the body-tube, and therefore to the steering wheel, therefore moves relative to the fixed support member in the direction of the steering axis and absorbs some or all of the energy required to be dissipated.

The pyrotechnic displacement actuator system is arranged so that, in the event of an impact, the mobile support member is connected to the fixed support member by:

the two coils, or
one of the two coils, or
the other coil, or
no coil.

In another embodiment of the invention a single coil of a metallic member with a particular section is connected to the fixed support member and to the mobile support member. The coil is disposed on one side of the vertical plane passing through the steering axis. The pyrotechnic displacement actuator system is adapted so that, in the event of an impact, the mobile support member is connected to the fixed support member by:

the coil, or
no coil.

In some embodiments of the invention, the retaining pin of each of the coils is disposed in the fixed support member and the fastening pin of each of the two coils is disposed in the mobile support member.

In other embodiments of the invention, the retaining pin of each of the two coils is disposed in the mobile support member and the fastening pin of each of the two coils is disposed in the fixed support member.

In different possible structures of the invention, each coil has its two connecting pins which are substantially parallel to each other.

According a type of structure, the two connecting pins of each of the two coils are in a vertical plane. The two connecting pins are substantially parallel to each other and substantially perpendicular to the steering axis.

According another type of structure, the two connecting pins of each of the two coils are substantially horizontal and substantially perpendicular to the vertical plane passing through the steering axis.

In various other possible architectures in accordance with the invention, each coil has two connecting pins that are substantially perpendicular to each other.

According to a type of structure, the retaining pins of the two coils are each in a vertical plane. The retaining pins are substantially parallel to each other and substantially perpendicular to the steering axis. The fastening pins of the two coils are substantially horizontal and substantially perpendicular to the vertical plane passing through the steering axis.

According to another type of structure, the retaining pins of the two coils are substantially horizontal and substantially perpendicular to the vertical plane passing through the steering axis. The fastening pins of the two coils are each in a vertical plane. The fastening pins are substantially parallel to each other and substantially perpendicular to the steering axis.

In two types of detailed structure in accordance with the invention:

the fixed support member consists of two bases that are fastened to the chassis;

the mobile support member has two lateral portions and a connecting portion, each lateral portion is extended toward the outside by a mobile base including a housing in which the corresponding fixed base of the fixed support member is engaged, the mobile base is connected to the fixed base and immobilized therein up to a particular value so that the immobilization ceases in the event of an impact, and the housing of the mobile base and the fixed base are arranged to facilitate assembly and disengagement in the event of an impact;

a coil is disposed outside each lateral portion, each coil having its two connecting pins mutually perpendicular.

The first type of detailed structure consists in that each retaining pin constitutes the connecting pin with the corresponding base and is in a vertical plane and is substantially perpendicular to the steering axis;

each fastening pin, which constitutes the connecting pin with the corresponding lateral portion, is substantially horizontal and substantially perpendicular to the vertical plane passing through the steering axis;

the fastening pin consists of a retaining rod that can be moved in the direction of its axis by the pyrotechnic displacement system;

the retaining pin of each of the two coils consists of a fixed retaining rod.

The second type of detailed structure consists in:

each retaining pin that constitutes the connecting pin with the corresponding lateral portion is substantially horizontal and substantially perpendicular to the vertical plane passing through the steering axis;

each connecting pin that constitutes the connecting pin with the corresponding fixed base is in a vertical plane and is substantially perpendicular to the steering axis;

the retaining pin consists of a retaining rod that can be moved in the direction of its axis by the pyrotechnic displacement system;

the fastening pin of each of the two coils consists of a fixed retaining rod.

In two other types of detailed structure in accordance with the invention:

the fixed support member consists of a base that is fastened to the chassis, the base being extended on each side by a substantially vertical lateral portion;

the mobile support member has two lateral portions and a connection portion, each mobile lateral portion includes a housing in which the corresponding fixed lateral portion of the fixed support member is engaged, the mobile lateral portion is connected to the fixed lateral portion and immobilized therein up to a particular value so that the immobilization ceases in the event of an impact, and the housing of the mobile lateral portion and the fixed lateral portion are arranged to facilitate assembly and disengagement in the event of an impact;

a coil is disposed outside each fixed lateral portion, each coil having its two connecting pins parallel to each other.

The first type of detailed structure consists in:

each retaining pin that constitutes the connecting pin with the corresponding fixed lateral portion is substantially horizontal and substantially perpendicular to the vertical plane passing through the steering axis;

each fastening pin that constitutes the connecting pin with the corresponding mobile lateral portion is substantially horizontal and is substantially perpendicular to the vertical plane passing through the steering axis;

the connecting pin consists of a retaining rod that can be moved in the direction of its axis by the pyrotechnic displacement system;

the retaining pin of each of the two coils consists of a fixed retaining rod.

The second type of detailed structure consists in that:

each fastening pin that constitutes the connecting pin with the corresponding fixed lateral portion is substantially horizontal and is substantially perpendicular to the vertical plane passing through the steering axis;

the retaining pin consists of a retaining rod that can be moved in the direction of its axis by the pyrotechnic displacement system;

the fastening pin of each of the two coils consists of a fixed retaining rod.

The variable energy-absorbing system in accordance with the invention therefore has the advantage of a structure that is simple to make, with guaranteed quality of fabrication when it is mass produced, as is the case in the automobile industry. Moreover, the system is easy to adapt to the overall size of existing steering columns. Finally, the variable energy-absorbing system matches the absorption of energy to the whole or a portion of that which is required, allowing in particular for the weight of the driver, the driver's position relative to the steering wheel, the safety belt and the speed of the vehicle, whilst preserving the same unwinding travel.

BRIEF DESCRIPTION OF THE DRAWINGS

Other features and advantages of the present invention will become more clearly apparent on reading the following description of several preferred embodiments of the invention, which description is given with reference to the corresponding accompanying drawings, in which:

FIG. 3 is a bottom view corresponding to part of FIG. 1;

FIG. 4 is a sectional view taken along the line IV—IV in FIG. 3;

FIG. 6 is a detailed perspective view of another embodiment of the invention with the connecting pins arranged perpendicular to the steering axis;

FIG. 7 is a view analogous to FIG. 6 of another embodiment of the invention with the connecting pins arranged perpendicular to the steering axis;

FIG. 8 is a detailed perspective view of another embodiment of the invention with the connecting pins arranged horizontally;

DETAILED DESCRIPTION

Figure 1:
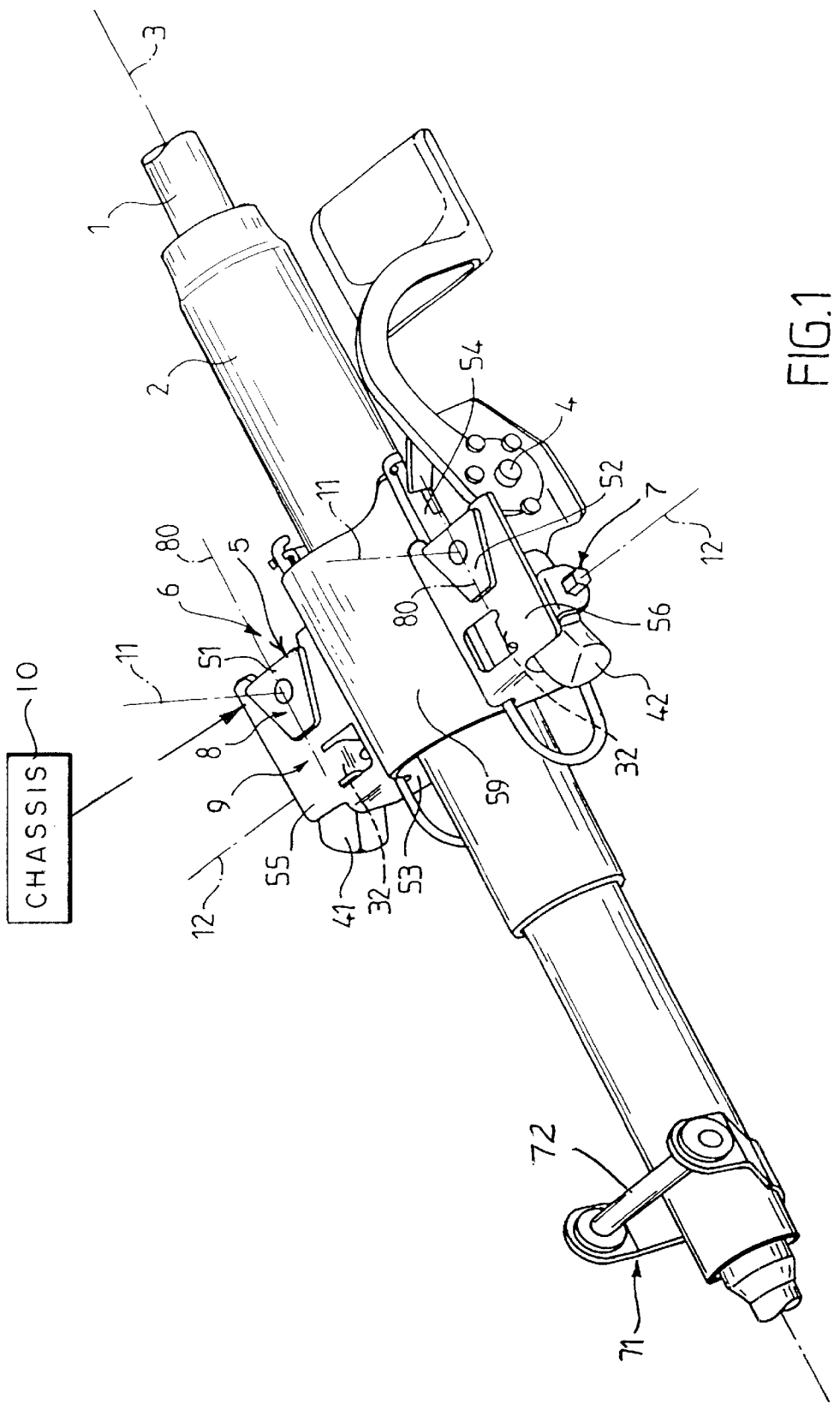
FIG. 1 is a top perspective view of an automobile vehicle steering column equipped with a system for variable absorption of energy in the direction of the axis of said column.
Figure 2:
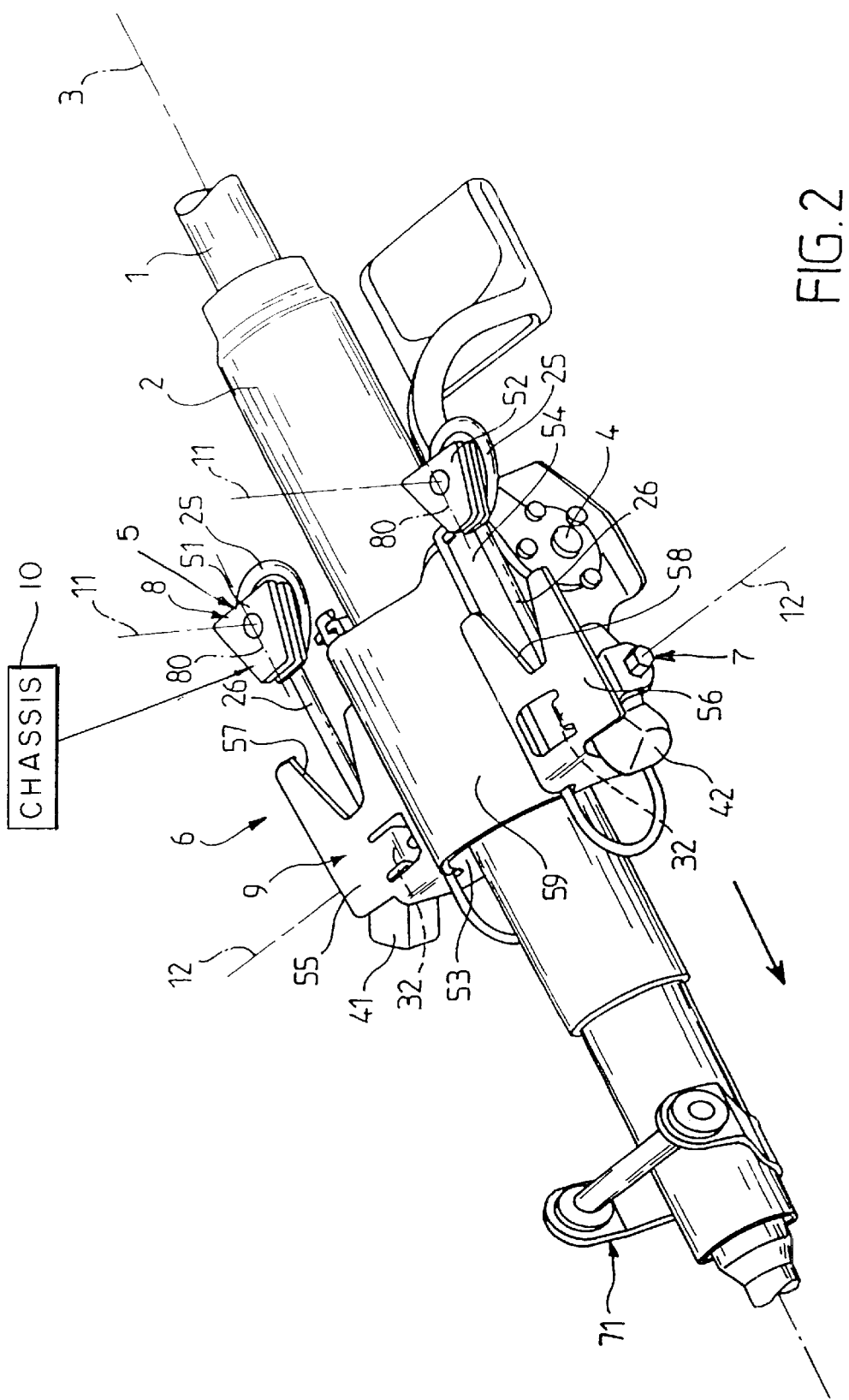
FIG. 2 is a top perspective view of the steering column from FIG. 1 after an impact.

As can be seen in FIGS. 1 and 2, the automobile vehicle steering column includes a steering shaft 1 which is rotatably mounted within a body-tube 2 for rotation about a steering axis 3. The body-tube 2 is connected to a support system 6 by an adjustment means 4 for adjusting its depth and/or inclination. The invention can equally be applied to a non-adjustable steering column, in which case the body-tube 2 is connected directly to the support system 6.

The support system 6 includes a fixed support means 8 and a mobile support means 9. The fixed support means 8 is fastened to the chassis 10 of the vehicle or to a member of the bodywork. The mobile support means 9 is connected to the body-tube 2 by the adjustment means 4. The mobile support means 9 is connected to the fixed support means 8 and is immobilized on said fixed support means up to a particular value, which allows for the impact to be absorbed, in order to enable the mobile support means 9 to slide inside the fixed support means 8 in the event of an impact.

The support system 6 is the upper fixing system of the steering column. A lower fixing system 71 of the steering column includes a horizontal pivot pin 72 which enables the height of said column to be adjusted.

In the remainder of the description, and in relation to the same member, terms such as "internal" or "interior" when used in relation to the steering axis 3 mean nearest the steering axis 3 and similarly terms such as "external" or "exterior" mean farthest away from said axis.

The variable energy-absorbing system in accordance with the invention includes one or two coils of a metallic member with a particular section. Each coil consists of a set of turns with a fastening system. The turns are mounted on a pin referred to as the retaining pin and the attachment system is formed around a pin referred to as the fastening pin. The single coil or both coils have a structure 21 shown in FIGS. 10A–10B or a structure 25 shown in FIGS. 11A–11B.

Figure 10A:
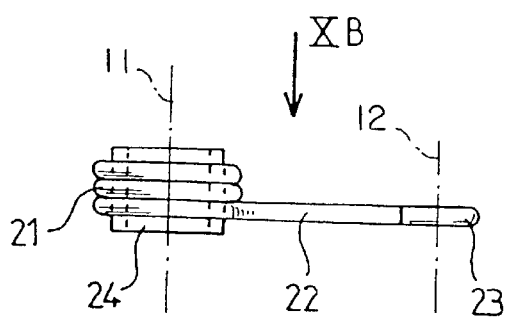
FIG. 10A is a side view of a coil in accordance with the invention with parallel connecting pins.
Figure 10B:
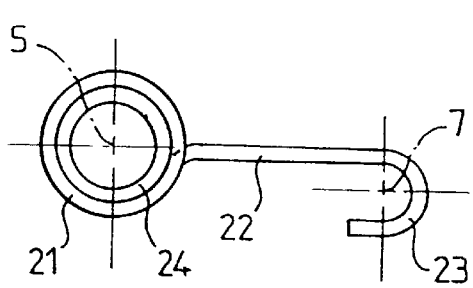
FIG. 10B is a top view in the direction of the arrow XB in FIG. 10A.

In the case of FIGS. 10A and 10B, the coil 21 has a linear portion 22 in substantially the same direction as the force to be damped and the linear portion 22 is extended by a free end 23. The turns of the coil 21 are mounted on a tubular roller 24 which is disposed on the retaining pin 5 of the coil 21. The fastening system is the free end 23 curved around the fastening pin 7 of the coil 21. The axis 11 of the retaining pin 5 and the axis 12 of the fastening pin 7 of the coil 21 are substantially parallel to each other.

Figure 11A:
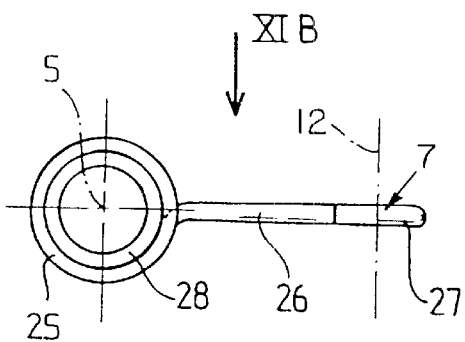
FIG. 11A is a side view of a coil in accordance with the invention with perpendicular connecting pins.
Figure 11B:
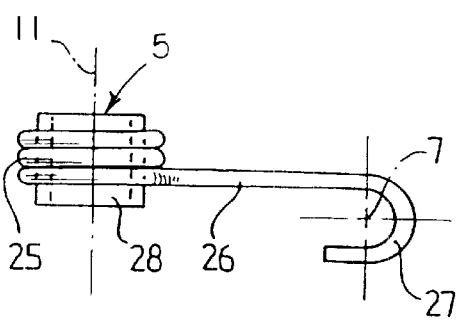
FIG. 11B is a top view in the direction of the arrow XIB in FIG. 11A.

In FIGS. 11A and 11B, the coil 25 has a linear portion 26 in substantially the same direction as the force to be damped and the linear portion 26 is extended by a free end 27. The turns of the coil 25 are mounted on a tubular roller 28 which is disposed on the retaining pin 5 of the coil 25. The fastening system is the free end 27 curved around the fastening pin 7 of the coil 25. The axis 11 of the retaining pin 5 and the axis 12 of the fastening pin 7 of the coil 25 are contained in planes that are substantially perpendicular to each other.

The two coils 21 or 25 are connected to the fixed support member 8 and to the mobile support member 9. One of the two coils 21 or 25 is disposed on one side of the vertical plane passing through the steering axis 3 and the other coil is disposed on the other side of said vertical plane passing through the steering axis 3.

The retaining pin 5 and the fastening pin 7 of each of the coils 21 or 25 constitute the connecting pins with the fixed support member 8 and the mobile support member 9.

Also, in accordance with one feature of the invention, each of the two coils 21 or 25 has one of its two connecting pins in the form of a retaining rod which can be moved in the direction of its axis. A pyrotechnic displacement system acts on the mobile retaining rod. The pyrotechnic displacement system is actuated by an actuator system.

The actuator system is arranged so that, in the event of an impact, and depending on the value of the external parameters adopted, the mobile support member 9 is connected to the fixed support member 8 by a required number of coils 21 or 25, so that the mobile support member 9, which is connected to the body-tube 2, and therefore to the steering wheel, moves relative to the fixed support member 8 in the direction of the steering axis and absorbs all or part of the energy required to be dissipated.

To be more precise, the pyrotechnic displacement actuator system is arranged so that, in the event of an impact, the mobile support member 9 is connected to the fixed support member 8 by:

the two coils 21 or 25, or one of the two coils 21 or 25, or the other coil 21 or 25, or no coil.

The variable energy-absorbing system can equally include a single coil 21 or 25 which is disposed on one side of the vertical plane passing through the steering axis 3. In this case, the coil 21 or 25 is mounted in the same manner as each coil of the system with two coils. With a single coil, the pyrotechnic displacement actuator system is arranged so that, in the event of an impact, the mobile support member 9 is connected to the fixed support member 8 by:

the coil 21 or 25, or no coil.

In one arrangement of each of the two coils 21 or 25, the retaining pin 5 of each of the two coils 21 or 25 is disposed in the fixed support means 8 and the fastening pin 7 of each of the two coils 21 or 25 is disposed in the mobile support means 9.

According to a second arrangement of each of the two coils 21 or 25, the retaining pin 5 of each of the two coils 21 or 25 is disposed in the mobile support means 9 and the fastening pin 7 of each of the two coils 21 or 25 is disposed in the fixed support means 8.

In another arrangement with two coils 21, the two connecting pins, i.e., the retaining pin 5 and the fastening pin 7, of each of the two coils 21 are in a vertical plane. Also, they are substantially parallel to each other and they are substantially perpendicular to the steering axis 3.

In another arrangement with two coils 21, the two connecting pins, i.e., the retaining pin 5 and the fastening pin 7, of each of the two coils 21 are substantially horizontal. Also, they are substantially perpendicular to the vertical plane passing through the steering axis 3.

In one arrangement with two coils 25, the retaining pins 5 of the two coils 25 are each in a vertical plane. Also, they are substantially parallel to each other and they are substantially perpendicular to the steering axis 3. The fastening pins 7 of the two coils 25 are substantially horizontal. Also, they are substantially perpendicular to the vertical plane passing through the steering axis 3.

In another arrangement with two coils 25, the retaining pins 5 of the two coils 25 are substantially horizontal. Also, they are substantially perpendicular to the vertical plane passing through the steering axis 3. The fastening pins 7 of the two coils 25 are each in a vertical plane. Also, they are substantially parallel to each other and they are substantially perpendicular to the steering axis 3.

The fixed support means 8 consists of two bases 51, 52 that are fastened to the chassis 10.

Said bases 51 and 52 are disposed in a plane that is substantially parallel to the steering axis 3 and that is substantially perpendicular to the vertical plane passing through the steering axis 3.

The mobile support means 9 has two substantially vertical lateral portions 53 and 54 and a connecting portion 59. Each lateral portion 53 and 54 is extended toward the outside by a corresponding mobile base 55 and 56. Said mobile bases 55 and 56 are disposed in a plane that is substantially parallel to the steering axis 3 and that is substantially perpendicular to the vertical plane passing through the steering axis 3. Each mobile base 55, 56 contains a housing opening 57, 58 in which the corresponding fixed base 51, 52 of the fixed support member 8 is engaged. Each mobile base 55 and 56 is connected to the corresponding fixed base 51, 52 and immobilized therein up to a particular value so that the immobilization ceases in the event of an impact. The housing openings 57, 58 of the mobile bases 55, 56 and the corresponding fixed bases 51, 52 are arranged to facilitate mounting and disengagement in the event of an impact in the direction of the common axis 80 of the housing 57, 58 and of the corresponding fixed base 51, 52; said axis 80 is contained in a vertical plane and is substantially parallel to the steering axis 3.

A coil 25 is disposed outside each lateral portion 53 and 54. The two connecting pin axes 11 and 12 of each coil 25 are contained in planes that are perpendicular to each other.

As best shown in FIG. 3, each coil 25 is mounted on a tubular roller 28 disposed around the retaining pin 5, which consists of the retaining tube 31 connected with the corresponding fixed base 51, 52. Said retaining pin 5 is contained in a vertical plane and is substantially perpendicular to the steering axis 3.

Each coil 25 has a linear portion 26 that extends in substantially the same direction as the force to be damped. Each linear portion 26 is extended by a free end 27 curved around the fastening pin 7, which constitutes the connecting pin 12 with the corresponding lateral portion 53, 54. Said fastening pin 7 is substantially horizontal and is substantially perpendicular to the vertical plane passing through the steering axis 3.

The fastening pin 7 of each of the coils 25 consists of a retaining rod 32 (FIG. 3) which can be moved in the direction of its axis by a pyrotechnic displacement system 41, 42 that is actuated by an actuator system, in accordance with the value of the external parameters adopted.

As shown in FIG. 4, the retaining pin 5 of each of the coils 25 consists of a fixed retaining tube 31 about which the tubular roller 28 rotates.

The embodiment shown in FIGS. 1 to 4 can be applied to an arrangement with only one coil 21 or 25.

Figure 5:
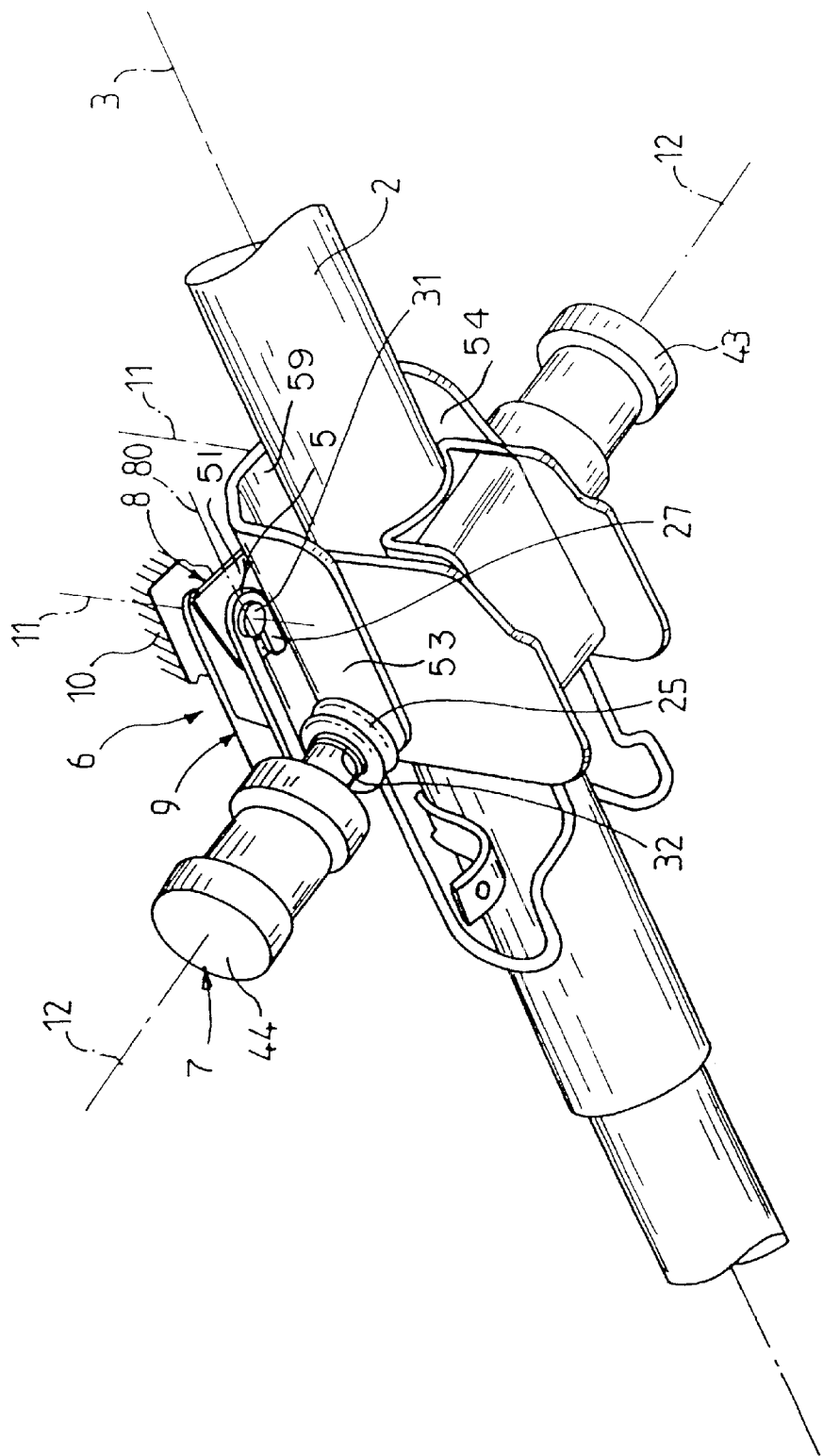
FIG. 5 is a bottom perspective view of another embodiment of the invention.

The system in accordance with the invention for variable absorption of energy in the direction of the axis of a steering column of the embodiment shown in FIG. 5 includes a fixed support means 8 and a mobile means 9.

The fixed support means 8 consists of two bases 51 and 52 (not shown in FIG. 5) that are fastened to the chassis 10.

Said bases 51 and 52 are disposed in a plane that is substantially parallel to the steering axis 3 and that is substantially perpendicular to the vertical plane passing through the steering axis 3.

The mobile support means 9 has two substantially vertical lateral portions 53 and 54 and a connecting portion 59. Each lateral portion 53 and 54 is extended toward the outside by a corresponding mobile base 55 and 56. Said mobile bases 55 and 56 are disposed in a plane that is substantially parallel to the steering axis 3 and that is substantially perpendicular to the vertical plane passing through the steering axis 3. Each mobile base 55, 56 contains a housing opening 57, 58 in which the corresponding fixed base 51, 52 of the fixed support member 8 is engaged. Each mobile base 55 and 56 is connected to the corresponding fixed base 51 and 52 and immobilized therein up to a particular value so that the immobilization ceases in the event of an impact. The housing 57 and 58 of the corresponding mobile base 55 and 56 and the corresponding fixed base 51, 52 are arranged to facilitate assembly and disengagement in the event of an impact in the direction of the common axis 80 of the housing 57, 58 and the corresponding fixed base 51, 52; said axis 80 is in a vertical plane and is substantially parallel to the steering axis 3.

A coil 25 is disposed outside each lateral portion 53 and 54. The two connecting pin axes 11 and 12 of each coil 25 are perpendicular to each other.

Each coil 25 is mounted on a roller 28 disposed around the retaining rod 32 which is substantially horizontal and has an axis 12 that is substantially perpendicular to the vertical plane passing through the steering axis 3.

Each coil 25 has a linear portion 26 in substantially the same direction as the force to be damped. Each linear portion 26 is extended by a free end 27 curved around the connecting pin 31 with the corresponding fixed base 51, 52. The axis 11 of fastening pin 31 is in a vertical plane and is substantially perpendicular to the steering axis 3.

The retaining means of each of the coils 25 consists of a retaining rod 32 that can be moved in the direction of its axis by a pyrotechnic displacement system 43, 44 that is actuated by an actuator system, according to the value of the external parameters adopted.

The fastening means of each of the coils 25 consists of a fixed retaining rod 31.

The embodiment shown in FIG. 5 can be applied to an arrangement with a single coil 21 or 25.

Referring now to FIG. 6, the system in accordance with the invention for variable absorption of energy in the direction of the axis of a steering column includes a fixed support means 8 and a mobile member 9.

The fixed support member 8 consists of two bases 52 fastened to the chassis 10.

Said bases 52 are disposed in a plane that is substantially parallel to the steering axis 3 and that is substantially perpendicular to the vertical plane passing through the steering axis 3.

The mobile support means 9 includes two mobile bases 56 disposed in a plane that is substantially parallel to the steering axis 3 and that is substantially perpendicular to the vertical plane passing through the steering axis 3. Each mobile base 56 contains a housing opening 58 in which the corresponding fixed base 52 of the fixed support member 8 is engaged. Each mobile base 56 is connected to the corresponding fixed base 52 and immobilized therein up to a particular value, so that the immobilization ceases in the event of an impact in the direction of the common axis 80 of the housing 58 and the corresponding fixed base 52; said axis 80 is in a vertical plane and is substantially parallel to the steering axis 3. The housing 58 of the mobile base 56 and the corresponding fixed base 52 are arranged to facilitate assembly and disengagement in the event of an impact.

A coil 21 is mounted on a roller 24 disposed around the retaining pin connected with the fixed base 52. The axis 13 of said retaining pin is in a vertical plane and is substantially perpendicular to the steering axis 3.

The coil 21 has a linear portion 22 in substantially the same direction as the force to be damped. Each linear portion 22 is extended by a free end 23 curved around the fastening pin connected with the mobile base 56. The axis 14 of said fastening pin means is in a vertical plane and is substantially perpendicular to the steering axis 3.

The fastening pin means of each of the coils 21 consists of a retaining rod 34 that can be moved in the direction of its axis by a pyrotechnic displacement system 45, 46 that is actuated by an actuator system, in accordance with the value of the external parameters adopted.

The retaining pin means of each of the coils 21 consists of a fixed retaining rod 33.

The embodiment shown in FIG. 6 can be applied to an assembly with one or two coils 21 or 25.

The variable system in accordance with the invention for absorbing energy in the direction of the axis of a steering column shown in FIG. 7 includes a fixed support member 8 and a mobile member 9.

The fixed support member 8 consists of two bases 52 fastened to the chassis 10.

Said bases 52 are disposed in a plane that is substantially parallel to the steering axis 3 and that is substantially perpendicular to the vertical plane passing through the steering axis 3.

The mobile support member 9 includes two mobile bases 56 disposed in a plane that is substantially parallel to the steering axis 3 and that is substantially perpendicular to the vertical plane passing through the steering axis 3. Each mobile base 56 has a housing opening 58 in which the corresponding base 52 of the fixed support member 8 is engaged. Each mobile base 56 is connected to the corresponding fixed base 52 and immobilized therein up to a particular value so that the immobilization ceases in the event of an impact. The housing 58 of the mobile base 56 and the corresponding fixed base 52 are arranged to facilitate assembly and disengagement in the event of an impact in the direction of the common axis 80 of the housing 58 and the corresponding fixed based 52; said axis 80 is in a vertical plane and is substantially parallel to the steering axis 3.

A coil 21 is mounted on a roller 24 disposed around the retaining pin 5, having an axis 13, and the connecting pin 7 having the axis 14 is connected with the mobile base 56. Said retaining pin axis 13 is in a vertical plane and is substantially perpendicular to the steering axis 3.

Each coil 21 has a linear portion 22 that extends in substantially the same direction as the force to be damped. Each linear portion 22 is extended by a free end 23 curved around the fastening pin 7, which constitutes the connecting pin 13 with the corresponding fixed base 52. Said fastening pin 7 is in a vertical plane and is substantially perpendicular to the steering axis 3.

The retaining pin 5 of each of the coils 21 consists of a retaining rod 33 that can be moved in the direction of its axis by a pyrotechnic displacement system 45, 46 that is actuated by an actuator system, in accordance with the value of the external parameters adopted.

The fastening pin 7 of each of the coils 21 consists of a fixed retaining rod 34.

The embodiment shown in FIG. 7 can be applied to a system with one or two coils 21 or 25.

The system in accordance with the invention for variable absorption of energy in the direction of the axis of a steering column shown in FIG. 8 includes a fixed support means 8 and a mobile means 9.

The fixed support means 8 consists of a base 61 that is fastened to the chassis. Said base 61 is extended on each side by a substantially vertical lateral portion 63 and 64.

The mobile support means 9 has two substantially vertical lateral portions 65 and 66 and a connecting portion 69. Each mobile lateral portion 65 and 66 has a corresponding housing 67 and 68 in which the corresponding fixed lateral portion 63 and 64 of the fixed support member 8 is engaged. Said mobile lateral portion 65 and 66 is connected to the corresponding fixed lateral portion 63 and 64 and immobilized therein up to a particular value so that the immobilization ceases in the event of an impact. The housing 67 and 68 of the mobile lateral portion 65 and 66 and the corresponding fixed lateral portion 63 and 64 are arranged to facilitate assembly and disengagement in the event of an impact in the direction of the common axis 90 of the housing 67, 68 and the corresponding fixed lateral portion 63, 64; said axis 90 is substantially parallel to the steering axis 3.

A coil 21 is disposed outside each fixed lateral portion 63, 64; each coil 21 has two parallel connecting pins 15, 16.

Each coil 21 is mounted on a roller 24 disposed around the retaining pin 5 having an axis 15 with the corresponding fixed lateral portion 63 and 64. Said retaining pin 5 is substantially horizontal and is substantially perpendicular to the vertical plane passing through the steering axis 3.

Each coil 21 has a linear portion 22 in substantially the same direction as the force to be damped. Each linear portion 22 is extended by a free end 23 curved around the fastening pin 7 having an axis 16 with the corresponding mobile lateral portion 65 and 66. Said fastening pin 7 is substantially horizontal and is substantially perpendicular to the vertical plane passing through the steering axis 3.

The fastening pin 7 of each of the two coils 21 consists of a retaining rod 36 that can be moved in the direction of its axis by a pyrotechnic displacement system 47, 48 that is actuated by an actuator system, in accordance with the value of the external parameters adopted.

The retaining pin 5 of each of the coils 21 consists of a fixed retaining rod 35.

The embodiment shown in FIG. 8 can be applied to a system with a single coil 21 or 25.

Figure 9:
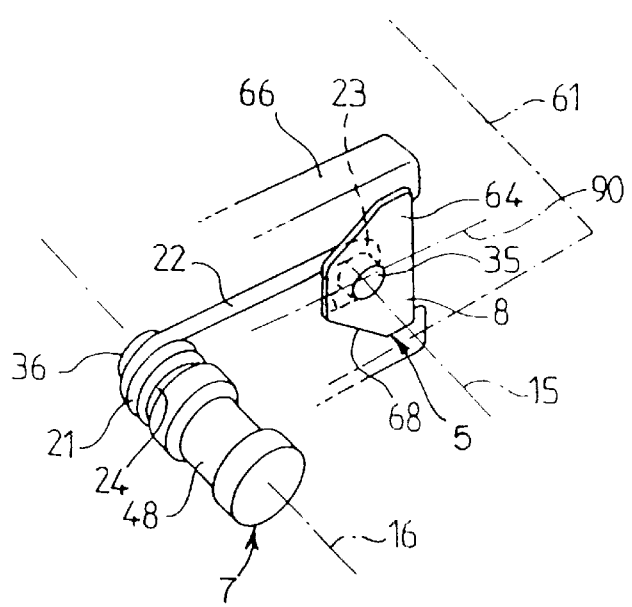
FIG. 9 is a view analogous to FIG. 8 of another embodiment of the invention with the connecting pins arranged horizontally.

The system in accordance with the invention for variable absorption of energy in the direction of the axis of a steering column shown in FIG. 9 includes a fixed support means 8 and a mobile means 9.

The fixed support member 8 consists of a base 61 that is fastened to the chassis. Said base 61 is extended on each side by a substantially vertical lateral portion 64.

The mobile support member 9 has two substantially vertical lateral portions 66 and a connecting portion. Each mobile lateral portion 66 has a corresponding housing 68 in which the corresponding fixed lateral portion 64 of the fixed support member 8 is engaged. Said mobile lateral portion 66 is connected to the corresponding fixed lateral portion 64 and immobilized therein up to a particular value so that the immobilization ceases in the event of an impact. The housing 68 of the mobile lateral portion 66 and the corresponding fixed lateral portion 64 are arranged to facilitate assembly and disengagement in the event of an impact in the direction of the common axis 90 of the housing 68 and the corresponding fixed lateral portion 64; said axis 90 is substantially parallel to the steering axis 3.

A coil 21 is disposed outside each fixed lateral portion 64; each coil 21 has two parallel connecting pins 5 and 7 having axes 15, 16, respectively.

Each coil 21 is mounted on a roller 24 disposed around the retaining pin 5, which constitutes the connecting pin 16 with the corresponding mobile lateral portion 66. Said retaining pin 5 is substantially horizontal and is substantially perpendicular to the vertical plane passing through the steering axis 3.

Each coil 21 has a linear portion 22 in substantially the same direction as the force to be damped. Each linear portion 22 is extended by a free end 23 curved around the fastening pin 7, which constitutes the connecting pin 15 with the corresponding fixed lateral portion 64. Said fastening pin 7 is substantially horizontal and is substantially perpendicular to the vertical plane passing through the steering axis 3.

The retaining pin 5 of each of the two coils 21 consists of a retaining rod 36 can be moved in the direction of its axis by a pyrotechnic displacement system 48 that is actuated by an actuator system, in accordance with the value of the external parameters adopted.

The fastening pin 7 of each of the coils 21 consists of a fixed retaining rod 35.

The embodiment shown in FIG. 9 can be applied to a system with a single coil 21 or 25.

Throughout the foregoing description, a coil 21 or 25 is disposed on each side of the vertical plane passing through the steering axis, the two coils carrying the same reference number. In accordance with the invention, each of the two coils 21 or each of the two coils 25 can have specific characteristics. Those characteristics include:

the configuration;

the distance between the retaining pin 5 and the fastening pin 7;

the number of turns; and the energy absorption capacity.

According to one feature of the invention, the energy-absorbing system acts directly in the direction of the axis 3 of the steering column. The pyrotechnic displacement system 41, 42; 43, 44; 45, 46; 47, 48 is actuated by an actuator system that consists of a central electronic unit. The central electronic unit manages the operation of said pyrotechnic displacement system allowing in particular for various parameters such as: whether the safety belt is worn or not, the weight of the driver, the driver's position relative to the steering wheel or the speed of the vehicle.

All embodiments of the energy-absorbing system in accordance with the invention described and shown in the drawings can be applied to a system with one or with two coils 21 or 25.

What we claim is:

1. A variable system for absorbing energy from a steering column of an automotive vehicle having a chassis (10), and a steering shaft (1) rotatably mounted in a body tube (2) for rotation about a steering axis (3), comprising:
   (a) fixed support means (8) connected with the vehicle chassis;
   (b) movable support means (9) connected with said body tube for movement relative to said fixed support means;
   (c) a pair of resilient metal coils (21; 25) arranged on opposite sides of a vertical plane containing said steering axis, each of said coils including a helical coil turn portion, and a linear end portion (22; 26) extending linearly from one end of said coil portion;
   (d) means connecting said coils between said fixed support means and said movable support means, including:
      (1) a pair of parallel retaining pins (5) connected with said fixed support means;
      (2) a pair of rollers (24; 28) rotatably mounted on said retaining pins, respectively, said helical coil turn portions been mounted concentrically about said rollers respectively;
      (3) a pair of fastening pins (7) connected with said movable support means in longitudinally spaced relation relative to said retaining pins, respectively, said linear end portions extending longitudinally in a direction of a force to be damped and having free ends connected with said fastening pins, respectively; and
   (e) pyrotechnic charge means for selectively axially displacing at least one of said retaining and fastening pins associated with each of said coils, whereby upon the occurrence of impact to the vehicle, said movable support means is connected with said fixed support means by a desired number of coils to absorb at least part of the energy to be dissipated as the body tube is moved longitudinally of the steering axis.

2. The system according to claim 1, wherein said pyrotechnic displacement actuator system is arranged so that, in the event of an impact, said mobile support member (9) is connected to said fixed support member (8) by one of said two coils.

3. The system according to claim 1, wherein the retaining pin (5) of each of said coils (21, 25) is connected with said fixed support means (8), and said fastening pin (7) of each of said two coils (21, 25) is connected with said mobile support means (9).

4. The system according to claim 1, wherein the retaining pin (5) of each of said two coils (21, 25) is connected with said mobile support means (9), and said fastening pin (7) of each of said two coils (21, 25) is connected with said fixed support means (8).

5. The system according to claim 1, wherein for each coil (21), said retaining pin (5) and said fastening pin (7) are substantially parallel to each other.

6. The system according to claim 5, wherein a retaining pin and fastening pin axes (13, 14) of the retaining and fastening pins of each of said two coils (21) are contained in a vertical plane, and are substantially perpendicular to said steering axis (3).

7. The system according to claim 5, wherein a retaining pin and fastening pin axes (15, 16) of the retaining and fastening pins of each of said two coils (21) are substantially horizontal and substantially perpendicular to said vertical plane passing through said steering axis.

8. The system according to claim 5, wherein said fixed support member (8) includes a base (61) that is fastened to the chassis (10), said base including two substantially vertical lateral fixed support portions; wherein said mobile support member (9) has two lateral mobile support portions (65, 66) and a connection portion (69), each mobile support lateral portion (65, 66) containing a housing opening (67, 68) in which the corresponding fixed lateral portion (63, 34) of the fixed support member (8) is engaged, said mobile support lateral portion (65, 66) being connected to and immobilized in said fixed lateral portion (63, 64), so that immobilization ceases in the event of an impact, and the housing (67, 68) of the mobile support lateral portion (65, 66) and the fixed support lateral portion (63, 64) being arranged to facilitate assembly and disengagement in the event of an impact; said coils (21) being disposed outside said fixed support lateral portions, respectively; wherein each retaining pin (5) being connected with the corresponding fixed support lateral portion (63, 64) and being substantially horizontal and substantially perpendicular to the vertical plane passing through said steering axis (3); wherein each fastening pin (7) being connected with the corresponding mobile support lateral portion (65, 66) and being substantially horizontal and is substantially perpendicular to said vertical plane passing through said steering axis; and further wherein each connecting pin (7) is axially, movable.

9. The system according to claim 5, wherein said fixed support means (8) includes a base (61) that is fastened to the chassis (10), includes two substantially vertical fixed support lateral portions (63, 64); wherein said mobile support member (9) includes two mobile support lateral portions (65, 66) and a connecting portion (69), each mobile support lateral portion (65, 66) includes a housing (67, 68) in which the corresponding fixed support lateral portion (63, 64) of the fixed support member (8) is engaged, said mobile lateral portion (65, 66) being connected to and immobilized in the fixed lateral portion (63, 64) so that immobilization ceases in the event of an impact, and the housing (67, 68) of the mobile support lateral portion (65, 66) and the fixed support lateral portion (63, 64) arranged to facilitate assembly and disengagement in the event of an impact; wherein said coils (21) are disposed outside said fixed support lateral portions (63, 64); wherein each retaining pin (5) being connected with the corresponding mobile support lateral portion (65, 66) and substantially horizontal and substantially perpendicular to said vertical plane passing through said steering axis; wherein each fastening pin (7) with the corresponding, fixed support lateral portion (63, 64) and being substantially horizontal and substantially perpendicular to said vertical plane passing through said steering axis (3); and further wherein said retaining pin (5) is axially movable by said pyrotechnic displacement system (47, 48).

10. The system according to claim 5, wherein said fixed support means (8) includes two bases (51, 52) that are fastened to the chassis (10); wherein said mobile support means (9) has two lateral portions (53, 54) and a connecting portion (59), each lateral portion (53, 54) being extended toward the outside by a mobile base (55, 56) with a housing (57, 58) in which the corresponding fixed base (51, 52) of the fixed support member (8) is engaged, said mobile base (55, 56) being connected to and immobilized in said fixed base (51, 52) so that immobilization ceases in the event of an impact, and the housing (57, 58) of the mobile base (55, 56) and the fixed base (51, 52) are arranged to facilitate assembly and disengagement in the event of an impact; wherein said coils (21) are disposed outside each lateral portion (53, 54), respectively; wherein each retaining pin (5) is connected with the corresponding fixed base (51, 52) lies in a vertical plane and substantially perpendicular to said steering axis; wherein each fastening pin (7) is connected with the corresponding mobile base (55, 56) and is contained in a vertical plane and is substantially perpendicular to the steering axis; and further wherein each fastening pin (7) is axially movable by the pyrotechnic displacement system (45, 46).

11. The system according to claim 5, wherein said fixed support member (8) includes two bases (51, 52) that are fastened to the chassis (10); wherein said mobile support member (9) has two lateral portions (53, 54) and a connecting portion (59), each lateral portion (53, 54) being extended toward the outside by a mobile base (55, 56) with a housing (57, 58) in which the corresponding fixed base (51, 52) of the fixed support member (8) is engaged, said mobile base (55, 56) is connected to and immobilized in said fixed base (51, 52) so that immobilization ceases in the event of an impact, and the housing (57, 58) of the mobile base (55, 56) and the fixed base (51, 52) are arranged to facilitate assembly and disengagement in the event of an impact; wherein said coils (21) are is disposed outside said lateral portions (53, 54), wherein each retaining pin (5) is connected with the corresponding mobile base (55, 56) and is contained in a vertical plane and substantially perpendicular to said steering axis (3); wherein each fastening pin (7) is connected with the corresponding fixed base (51, 52) and is contained in a vertical plane and is substantially perpendicular to the steering axis (3); and further wherein each retaining pin (5) is axially movable by said pyrotechnic displacement system (45, 46).

12. The system according to claim 1, wherein for each coil (25), the axes of said retaining pin (5) and said fastening pin (7) are contained in planes that are substantially perpendicular to each other.

13. The system according to claim 12, wherein said retaining pins (5) of said two coils (25) are each contained in a vertical plane and are substantially parallel to each other and substantially perpendicular to said steering axis (3), and said fastening pins (7) of said two coils (25) are substantially horizontal and substantially perpendicular to said vertical plane passing through said steering axis.

14. The system according to claim 12, wherein said retaining pins (5) of said two coils (25) are substantially horizontal and substantially perpendicular to said vertical plane passing through said steering axis (3), and said fastening pins (7) of said two coils are each in a vertical plane and substantially parallel to each other and substantially perpendicular to said steering axis (3).

15. The system according to claim 12, wherein said fixed support member (8) includes two bases (51, 52) that are fastened to the chassis (10); wherein said mobile support member (9) has two lateral portions (53, 54) and a connecting portion (59), each lateral portion (53, 54) being extended toward the outside by a mobile base (55, 56) containing a housing opening (57, 58) in which the corresponding fixed base (51, 52) of said fixed support member (8) is engaged, said mobile base being connected to and immobilized in said fixed base (51, 52) so that said immobilization ceases in the event of an impact, and said housing (57, 58) of said mobile base (55, 56) and said fixed base (51, 52) are arranged to facilitate assembly and disengagement in the event of an impact; wherein said coils (25) are disposed outside each lateral portion (53, 54), respectively, each coil having its two connecting pin axes (11, 12) arranged mutually perpendicular; wherein each retaining pin (5) is connected with the corresponding base (51, 52) and is contained in a vertical plane and is substantially perpendicular to said steering axis (3); wherein each fastening pin (7), is connected with the corresponding lateral portion (53, 54) and is substantially horizontal and substantially perpendicular to said vertical plane passing through said steering axis (3); and further wherein each retaining pin is axially displaceable by said pyrotechnic displacement means.

16. The system according to claim 12, wherein said fixed support means (8) includes two bases (51, 52) that are fastened to the chassis (10); wherein said mobile support means (9) has two lateral portions (53, 54) and a connecting portion (59), each lateral portion (53, 54) being extended toward the outside by a mobile base (55, 56) including a housing (57, 58) in which the corresponding fixed base (51, 52) of the fixed support member (8) is engaged, said mobile base (55, 56) being connected to and immobilized in said fixed base (51, 52) so that the immobilization ceases in the event of an impact, and the housing (57, 58) of the mobile base (55, 56) and the fixed base (51, 52) are arranged to facilitate assembly and disengagement in the event of an impact; wherein said coils (25) are arranged outside each lateral portion (53, 54), respectively, wherein each retaining pin (5) is connected with the corresponding lateral portion (53, 54) and is substantially horizontal and substantially perpendicular to said vertical plane passing through said steering axis; wherein each fastening pin (7) is connected with the corresponding fixed base (51, 52) and is in a vertical plane and substantially perpendicular to said steering axis; each retaining pin (5) being axially movable by said pyrotechnic displacement system (43, 44).

* * * * *